United States Patent [19]

Leftheris

[11] 3,961,739

[45] June 8, 1976

[54] METHOD OF WELDING METALS USING STRESS WAVES

[75] Inventor: Basil P. Leftheris, East Northport, N.Y.

[73] Assignee: Grumman Aerospace Corporation, Bethpage, N.Y.

[22] Filed: May 7, 1974

[21] Appl. No.: 467,723

Related U.S. Application Data

[60] Division of Ser. No. 244,402, April 17, 1972, Pat. No. 3,824,824, which is a continuation-in-part of Ser. No. 863,045, Oct. 2, 1969, abandoned.

[52] U.S. Cl. .............................. 228/110; 29/243.54; 29/421 M; 228/115
[51] Int. Cl.² .................... B23K 21/02; B23P 11/00
[58] Field of Search ........ 29/470.1, 421 M, 243.54; 72/56; 310/8.1, 8.3; 228/1, 115, 242, 239, 235, 110

[56] References Cited
UNITED STATES PATENTS

| | | |
|---|---|---|
| 3,108,325 | 10/1963 | Harvey et al. ............... 29/421 M |
| 3,279,228 | 10/1966 | Brower ............................ 72/56 M |
| 3,483,611 | 12/1969 | Balamuth et al. ............ 29/243.54 |
| 3,573,781 | 4/1971 | Shoh ................................... 310/8.1 |
| 3,609,851 | 10/1971 | McMaster et al. ............ 29/243.54 |
| 3,704,506 | 12/1972 | Orr et al. ....................... 29/243.54 |

*Primary Examiner*—Ronald J. Shore
*Assistant Examiner*—Gus T. Hampilos
*Attorney, Agent, or Firm*—Morgan, Finnegan, Pine, Foley & Lee

[57] ABSTRACT

Method for forming or deforming a metal workpiece by passing a stress wave through the metal workpiece sufficient to render it momentarily plastic. The apparatus is basically comprised of a stress wave focusing device or amplifier. In operation, a workpiece is placed in a die or shaping means. The stress wave amplifier is then arranged to direct or focus the stress wave to the metal workpiece. Next, a stress wave is generated and passed through the stress wave focusing device, imparting a momentary state of plasticity to the metal workpiece.

3 Claims, 1 Drawing Figure

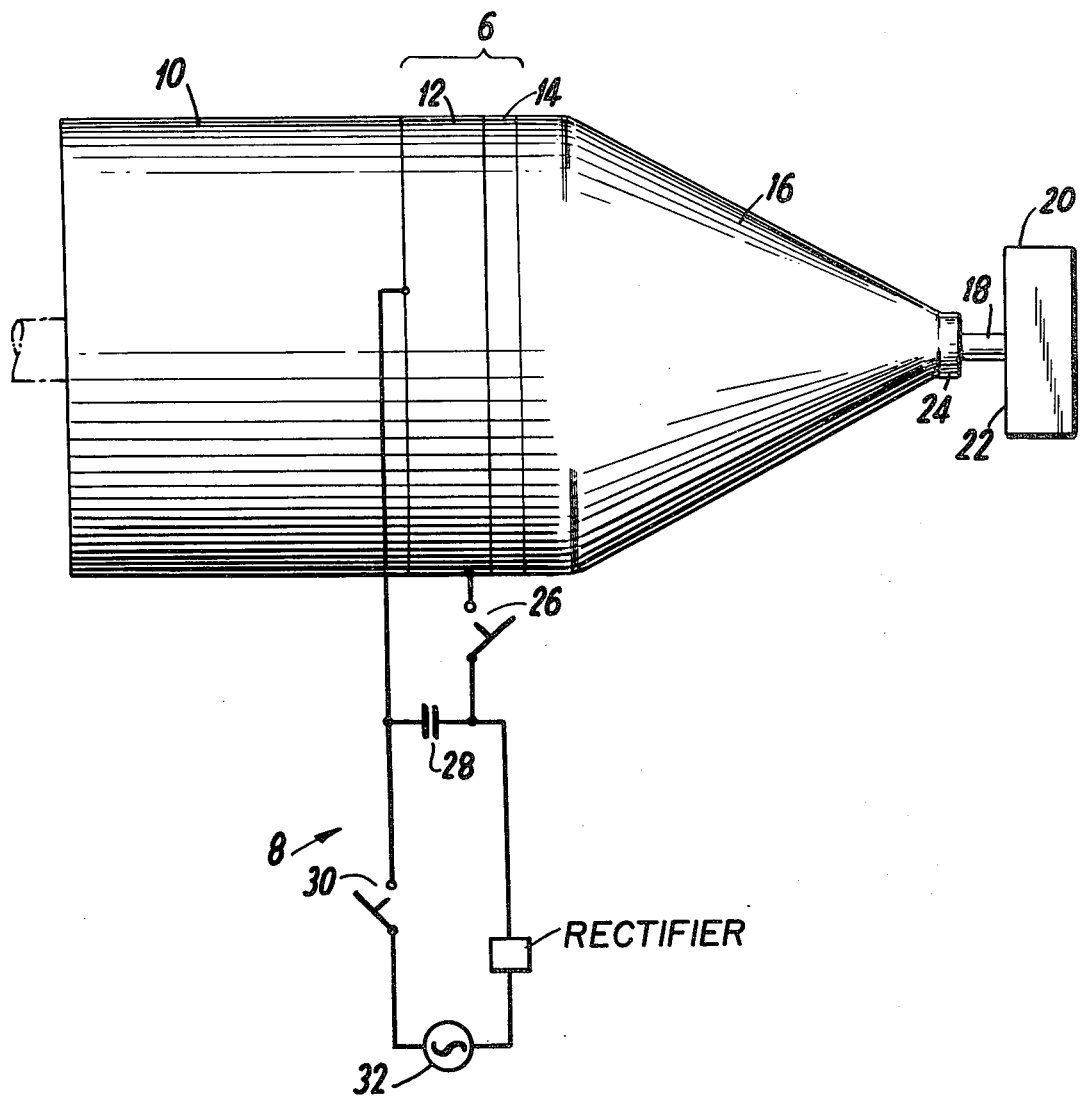

METHOD OF WELDING METALS USING STRESS WAVES

CROSS REFERENCE TO RELATED APPLICATIONS

This is a division, of copending application Ser. No. 244,402, filed Apr. 17, 1972, which is a continuation-in-part of application Ser. No. 863,045 filed Oct. 2, 1969, now abandoned, entitled METHOD AND APPARATUS FOR DEFORMING METAL (Basil P. Leftheris). Other related patents and applications are U.S.P. 3,646,791, issued March 7, 1972, entitled METHOD AND APPARATUS FOR DEFORMING A METAL WORKPIECE, FOR UPSETTING RIVETS AND FOR BLIND RIVETING (Basil P. Leftheris); U.S. Pat. No. 3,731,370, issued May 8, 1973, entitled METHOD AND APPARATUS FOR DEFORMING A METAL WORKPIECE, FOR UPSETTING RIVETS AND FOR BLIND RIVETING (Basil P. Leftheris).

BACKGROUND OF THE INVENTION

1. Field of the Invention

This invention relates basically to a method and apparatus for deforming a metal workpiece by passing a stress wave through the workpiece sufficent to render the metal momentarily plastic. More specifically, this invention relates to a method and apparatus for converting electromagnetic energy into a stress wave which is amplified, focused and directed to a metal workpiece such that the metal is in a plastic state when the stress wave passes through the workpiece.

2. Description of the Prior Art

At the present time, the various methods of metal forming basically employ energy in the form of an externally applied force or heat. An illustration of this can be found in metal forging, where an external force or impact is applied to a metal workpiece, which may be hot or cold, in order to form it into the desired shape. Another illustration is that where metal is heated to melting and then poured as a fluid into a mold and allowed to cool.

In the case of metal forging, a great amount of energy is required to do the work which in turn necessitates the utilization of large and bulky machinery. This is true whether the metal is cold-worked or hot-worked although less force is required in hot-working. Examples of such machinery include power presses, hydraulic presses, drop hammers, and steam hammers. Another metal working process employing similar techniques is riveting. Pneumatic hammers and stationary presses are used in making riveted joints, the press giving the structurally better joint.

The distinction between cold-working and hot-working of metal rests on the relationship of the processing temperature to the recrystallization temperature of the metal. The recrystallization temperature is that temperature at which there is a marked softening of the metal being worked. Cold-working of a metal is the deformation of the metal at a temperature below the recrystallization point. More power is required for cold-deformation since the metal is harder and less ductile than during hot-working.

As noted above, the cold-working technique has been and is used to upset rivets. These methods produce results which are not wholly successful. Rivet failures are not uncommon and occur unpredictably in operation. Tests done with various conventional riveting machines, which upset rivets by cold-working, indicate wide inconsistencies of failure under load. This illustrates only one instance where the present cold-working methods are inadequate and require improvement.

Another method of metal forming is by use of an expanding magnetic field as illustrated by the patent to Harvey et al, Ser. No. 2,976,907, issued Mar. 28, 1961. The Harvey patent discloses the use of a magnetic field established by a coil to create a pressure or force on the metal workpiece thereby deforming it to the desired shape.

More recently, laboratory investigation and study has indicated that metals may be deformed when subjected to stress waves. For example, see "Large Deformation Dynamic Plasticity At An Elastic-Plastic Interface," by J. F. Bell appearing in J. Mech. Phys. Solids, 1968, Vol. 16, p. 295. In this report it is shown that a state of plasticity can be established in metal by a stress wave generated by striking two hardened metal bars together.

It should also be noted that the present state of the art includes an apparatus which utilizes the electromagnetic. repulsion of two magnetic fields and the shock produced therefrom to hold a metal workpiece in position while it is deformed by other means. (Harvey et al, U.S. Pat. No. 3,108,325, FIG. 1, issued Oct. 29, 1963.) This technique, however, does not utilize a stress wave which renders the metal plastic to accomplish the deformation.

It has not heretofore been possible to form metallic objects by the utilization of a stress wave passing through the metal except as an object of scientific study. There are no commercial methods which utilize this concept nor are there any commercial or scientific methods which utilize electromagnetic forces to generate a stress wave sufficient to render metal momentarily plastic.

SUMMARY OF THE INVENTION

It is therefore an object of the present invention to provide a metal forming apparatus utilizing stress waves.

It is a further object of the present invention to provide a metal forming apparatus which is much more compact in size than present state of the art machines.

For accomplishing the present invention, a device is provided which is comprised basically of an energy source connected to a pancake coil, a disc shaped aluminum driver adjacent to the coil, an amplifier or focussing means adjacent to the aluminum driver, and a shock absorbing mechanism positioned to the rear of the coil. A die or other shaping means is also necessary for forming the metal workpiece into the desired shape. When the device is used for riveting or spot welding a bucking mass is necessary on one end of the rivet or metal workpieces.

The discharge from the energy source establishes a magnetic field around the coil, this magnetic field in turn induces a current in the aluminum driver. The induced current sets up a magnetic field around the aluminum driver and the interaction of the two magnetic fields causes a stress wave to be generated which is then propagated through the focussing means and into the metal workpiece.

DESCRIPTION OF THE DRAWINGS

The invention will be described and understood more readily when considered with the attached drawing which is a schematic side elevational view of a forming device and workpiece embodying the principles of the present invention.

DESCRIPTION OF THE PREFERRED EMBODIMENT

The method and apparatus of the present invention is particularly suitable for use in forging, riveting, punching and spot welding operations. In fact, the identical tool, with slight variations, may be used to accomplish each one of these operations. The variations necessary may involve a change in the energy source and/or a different sized or shaped amplifier. The common ground running through each of these operations is that a stress wave is transmitted to the metal object which increases the energy density within the metal thereby transforming the properties of the metal to accomplish the particular operation.

According to the method of the instant invention, a metal workpiece is deformed at a temperature below its recrystallization temperature. The workpiece is subjected to a stress wave generated by the electromagnetic repulsion of two high intensity magnetic fields, which imparts a particle velocity in the direction of propagation of the wave and simultaneously increases the stress in the workpiece. The particle velocity and stress in the workpiece are increased to a predetermined level at which the metal of the workpiece becomes momentarily plastic. The axial momentum of the workpiece, produced by the propagation of the stress wave through the workpiece, causes a compressive deformation in the direction of propagation and an expansion at right angles to this direction of propagation. This expansion is governed by Poisson's ratio which is the ratio between the lateral strain and the direct tensile strain. This compression and resulting outward expansion of the metal workpiece into a die or other confining area will produce the shape desired.

In addition to the above method of deforming a metal workpiece, the same basic concept along with the same apparatus may be used for spot welding of metals. When spot welding is desired the two metal objects are positioned such that the spot desired to be welded on each object is in contact. A stress wave is generated by the electromagnetic repulsion of two high intensity magnetic fields; this stress wave is focussed on one of the metal objects. The point of contact of the two metallic objects acts as an energy sink where the energy imparted to the metal by the stress wave is converted to heat energy. The heat generated at the point of contact is high enough to locally melt the two metal objects and therefore weld them together. It has been found beneficial to this welding operation to heat one of the metal workpieces, thereby allowing for greater ease in operation. Welding between two separate metals can occur at the required pressure and temperature, provided the surfaces are clean (not oxidized). The high amplitude stress wave propagated through a small area provides the high pressure requirement and through local metal flow it exposes virgin material which is clean. Furthermore, heat is developed locally through high rate metal deformation, so that the third requirement of temperature is obtained.

Basically, the apparatus of the present invention, as depicted in the drawing, is comprised of a power supply 8, a stress wave generator 6, a stress wave focussing means or amplifier 16, and means 20 for reflecting the stress wave transmitted through the workpiece 18.

The power supply 8 comprises an energy source 32 and switch means 30 connected in parallel to a capacitor bank 28 which is then connected by switch means 26 to the stress wave generator 6. The stress wave generator 6 comprises a pancake coil 12 and aluminum driver 14, situated in side by side relationship. The stress wave generated in the aluminum driver 14 passes through the amplifier or focussing means 16 and tip 24 and thence to the rivet 18. The head of the rivet 18 is in full contact with the hardened surface 22 of the bucking mass or means 20 for reflecting the stress wave transmitted through the workpiece 18.

In operation, the capacitor bank 28 is charged by energy source 32 when switch 30 is closed. After the capacitor bank is charged, switch 30 is opened and switch means 26 is closed whereby a high amperage current pulse, of short duration, flows through the pancake coil 12, the duration of the current pulse being in the order of microseconds. A high intensity magnetic field is set up around the coil 12 and this field intersects the aluminum driver 14, which acts as a one turn secondary winding of a transformer, thereby inducing a current therein. The induced current flowing through the driver 14 sets up a high intensity magnetic field around the driver 14. The electromagnetic repulsion established by the interaction of the two high intensity magnetic fields generates a stress wave in the aluminum driver 14 which is propagated through the amplifier 16 and tip 24 and thence through the rivet 18. The combined effect of the bucking mass 20 and the passage of the stress wave through the rivet 18 causes the rivet 18 to deform axially and radially while simultaneously the mass of the amplifier 16 causes a head to be formed on the rivet 18 at the common juncture with member 24.

The device as described above has been successfully used to upset stainless steel and titanium rivets and has also been used to spot weld two metallic workpieces. The machine can be fixed in a frame with a workpiece being fed thereto or it can be used portably and held by the user. The only structural difference required by the two uses is that in the portable machine a bolt is threaded into the center of the base of the amplifier 16 and extends through the shock absorber 10 having a nut to hold the components in tight relationship; when used in a frame a stud extends through the shock absorber 10 and into the amplifier 16 in order to keep the machine centered.

In one illustrated embodiment, wherein the metal forming device according to the present invention was placed in a frame and used in a riveting operation, NAS (National Aeronautical Standard) stainless steel rivets were successfully upset. The capacitor bank was of a low inductance and with the coil connected and electromagnetically coupled to the aluminum driver had an operating frequency of 20 KC/sec. A high electrical current was fed to the coil by the capacitor bank. The coil included 18 turns of a rectangularly shaped copper member ½ inch by 0.080 inch. The coil was potted in polyurethane compound equivalent to 60 durometer rubber having ample elasticity, the dimensions of the coil being 1 ½ inches thick by 6 inches in diameter and having a 1 inch diameter circular hole through the center. The driver consisted of 6061-T4 aluminum, ¼ inch thick by 6 inches diameter and having a one inch circular hole through the center. The 6061-T4 aluminum was used since it is of good conductivity and sufficient strength to withstand the forces produced in the operation. The amplifier or focussing device, constructed of 4340 hardened steel, had a ½ inch by 6 inch diameter cylindrical base section leading into a truncated cone 6 inches long and having a ¾ inch diameter top to which a ½ inch long cylindrical section was attached. At the tip of the focussing device a rivet set was attached having a first cylindrical section ¼ inch long and ⅛ inch diameter inserted into the focussing device and exposing a second cylindrical section ¼ inch long and ½ inch diameter. The shock absorber consisted of a series of rubber pads attached to the coil. A centering stud of one inch diameter was inserted into the circular holes of the various components and into a 1 inch diameter by 1 inch deep hole in the base of the focussing device. The rivets upset by this device were of a ½ inch length and ¼ inch, 3/16 inch, 150 inch diameter. The voltage required to upset these different size rivets was respectively 7 KV, 5.2 KV, and 4 KV.

In another illustrated embodiment, which is a mere variation from that described above, a metal forming device was used by hand, rather than in a frame, for the riveting operation. The only variations from the above example consisted of a change in dimensions of the components. The coil diameter was reduced to 4 inches, as was the diameter of the aluminum driver and the base of the focussing device. All other dimensions remained the same. Also, instead of a centering stud, a threaded bolt was fitted into the base of the focussing device and secured by a nut and washer at the end of the shock absorber.

In designing the prototype riveter, it was necessary to design a focussing device or amplifier to concentrate the energy of the pressure pulse generated by the magnetic coil and directed to the workpiece sufficient to successfully upset the stainless steel or titanium rivets. The analysis of this device was accomplished by using the momentum, continuity, and stress strain relationships used in the uniaxial propagation of stress wave pulses in solid bars.

Consider an element of a focussing or amplifying device wherein:-
$dx_0$ = the initial thickness of the element;
$dx$ = the final thickness of the element and equals $\delta x/\delta x_0 \cdot dx_0$
$A$ = the cross sectional area of the element;
$s$ = the stress in the direction of motion;
$\epsilon$ = the strain in the direction of motion; and
$\chi$ = the distance from the left end of the device.

By definition, strain equals the final thickness less the initial thickness divided by the initial thickness, or $$\epsilon = \frac{dx - dx_0}{dx_0} = \frac{\delta x}{\delta x_0} - 1 \quad (1)$$

Partially differentiating equation (1) with respect to time, we obtain:

$$\frac{\delta \epsilon}{\delta t} = \frac{\delta}{\delta t}\left(\frac{\delta x}{\delta x_0} - 1\right) = \frac{\delta}{\delta x_0}\left(\frac{\delta x}{\delta t}\right) = \frac{\delta u}{\delta x_0} \quad (2)$$

where $$u = \frac{\delta x}{\delta t}$$

the particle velocity.
Since $s = E \cdot \epsilon$, equation (2) can be rewritten as:

$$\frac{\delta s}{\delta t} - E \cdot \frac{\delta u}{\delta x_0} = 0 \quad (3)$$

where E = Young's Modulus of Elasticity.
From Newton's First Law of Physics we have:

$$A\rho dx \cdot \frac{\delta u}{\delta t} = \frac{\delta(As)}{\delta x} \cdot dx \quad (4)$$

where $\rho$ is the density of the material.
Mass continuity equation can be written as follows:

$$\rho_0 A_0 dx_0 = \rho A dx$$

and for $A = A_0$ $$\rho_0 dx_0 = \rho dx = \rho \frac{\delta x}{\delta x_0} dx_0$$

or $$\rho_0 = \rho \frac{\delta x}{\delta x_0} \quad (5)$$

Substituting for $dx$ in equation (4), we have:

$$\left(A\rho \frac{\delta x}{\delta x_0} dx_0\right)\frac{du}{dt} = \frac{\delta(As)}{\delta x}\left(\frac{\delta x}{\delta x_0}\right) dx_0$$

or $$A\rho \frac{\delta x}{\delta x_0} \cdot \frac{du}{dt} = \frac{\delta(As)}{\delta x}\left(\frac{\delta x}{\delta x_0}\right) = \frac{\delta(As)}{\delta x_0}$$

Substituting from equation (5) we have:

$$A\rho_0 \frac{du}{dt} = \frac{\delta(As)}{\delta x_0}$$

or $$\rho_0 \frac{\delta u}{\delta t} = \frac{\delta s}{\delta x_0} + \frac{s}{A} \cdot \frac{\delta A}{\delta x_0} \quad (6)$$

Two forms were considered for the focussing device;
a. an exponential shape governed by the formula:

$$A = A_0 e^{-nx} \quad (7)$$

and
b. a conical shape governed by the formula:

$$A = A_0 \left(1 - \frac{x_0}{R_0 K}\right)^2 \quad (8)$$

where:
$A_o$ = the area of the larger or left hand end of the focussing device;
$n$ = a constant to be determined;
$R_o$ = radius of the larger end of the focussing device;
$x_o$ = the length of the focussing device; and
$k$ = the tangent of the angle described by the edge of the cone and the base of the cone.

From experimental results we also have the relationship:

$$\frac{du}{dt} = m \qquad (9)$$

where $m$ is a constant.

Combining equations (6), (3), (7) and (9), we are able to derive the following equation for the exponentially shaped focussing device:

$$\frac{s}{s_0} = \frac{1}{ct_A h}\left(\frac{A_0}{A} - 1\right) + \frac{A_0}{A} \qquad (10)$$

where:
$c = \sqrt{E/\rho}$ the speed of sound in the material;
$s_0$ = the stress at the larger end of the focussing device which is directly related to the energy input at this point;
$s$ = the stress at the smaller end of the focussing device;
$A$ = the cross sectional area at the smaller end of the focussing device; and
$t_A$ = the time required for the particle velocity to reach a maximum.

Combining equations (6), (3), (8) and (9), we are able to derive the following equation for the conically shaped focussing device:

$$\frac{s}{s_0} = \frac{R_0 K}{3ct_A}\left(\frac{A_0}{A} - 1\right) + \frac{x_0}{3ct_A} + \frac{A_0}{A} \qquad (11)$$

Taking the case where:
$c = 200,000$ in./sec.
$t_A = 20 \times 10^{-6}$ sec. $A_0/A = 11.8$
$x_0 = 4$ in.,
and
$k = 1.89$.

Utilizing equation (10), we obtain a stress multiplication $(s/s_0) = 15.9$.

Utilizing equation (11), we obtain a stress multiplication $(s/s_0) = 17$.

From measurements it was determined that the pressure developed at the electromagnetic coil varied between about 5,000 and 9,000 p.s.i. and therefore an average of 7,000 p.s.i. was used.

Using the cone, the theoretical stress at the rivet was determined to be 17 ×7,000 p.s.i. or 119,000 p.s.i. The material of the rivet had a yield strength of 90,000 p.s.i. and, therefore, the theoretical stress developed by the focussing device at the rivet was determined to be sufficient. In the tests that followed, stainless steel rivets having a ¼ inch diameter and ⅜ inch length were successfully upset.

Using high speed photography it was found that the particle velocity at the small end of the focussing device was approximately 640 in./sec. Knowing this velocity and using the momentum equation, the stress at the small end of the focussing device can be calculated:

$$s = \frac{\rho c u}{g}$$

where:
$\rho = 0.3$ lb./cu. in.
$c = 20 \times 10^4$ in./sec.
$u = 640$ in./sec.
$g = 32.2$ ft./sec.$^2$ therefore
$s = 100,000$ p.s.i.

This calculated stress compares well with the theoretical stress of 119,000 p.s.i.

The invention relies on stress waves to deform material. Therefore, without wishing to be bound by theory, the phenomenon occurring in the apparatus of the invention will be set forth to provide an insight into the invention. It is believed that an appreciation of stress wave theory is necessary since much confusion presently exists due to the occasional use of the term stress wave in an imprecise and undisciplined manner.

First of all, it must be understood that stress waves are a distinct phenomenon separate from shock waves or other energy forms commonly confused with stress waves. Stress waves are a form of energy transfer which cause motion within a solid. If an arbitrary small disturbance is originated within a restricted portion of an elastic solid medium, neighboring portions will soon be set in motion and thrown into states of strain. The portion of the medium which is disturbed at a subsequent instant will not be the same as that which was disturbed initially. A Treatise on the Mathematical Theory of Elasticity, A. G. H. Love, Dover Publications.

Stress wave phenomenon is markedly different from rigid dynamics. As set forth by H. Kolsky in Stress Waves in Solids, Dover, 486-61098-5 (Introduction):

"In rigid dynamics it is assumed that, when a force is applied to any one point in a body, the resultant stresses set every other point in motion instantaneously and the force can be considered as producing a linear acceleration of the whole body, together with an angular acceleration about its center of gravity. In the theory of elasticity, on the other hand, the body is considered as in equilibrium under the action of applied forces and the elastic deformations are assumed to have reached their static values. These treatments are sufficiently accurate for problems in which the time between the application of a force and the setting up of effective equilibrium is short compared with the times in which the observations are made. When, however, we are considering the effects of forces which are applied for only very short periods of time, or are changing rapidly, the effects must be considered in terms of the propagation of stress waves."

The difference of plastic deformation set by forces of the rigid dynamics type and the plastic deformation due to the propagation of a stress wave can also be seen by considering the metal deforming devices using impact energy and force application to effect deformation.

With impact devices a body near the time changing magnetic field is accelerated. Thus, kinetic energy is stored (½ mv$^2$). Then the body impacts on the workpiece transferring its kinetic energy to deformation.

With rigid dynamics type force application, the force produced by the magnetic field is applied to the workpiece through a medium that possesses fluidity (ability to flow under hydrostatic pressure). Thus, the magnetic pressure acts on the surface of the workpiece as if it were fluid. The workpiece instantly experiences the pressure and it moves according to the classical Newton's law (Force = mass × acceleration).

Conversely, the stress wave produced by the pancake coil is characterized not by its frequency but, instead, by its wave length. Consider a rod of length L

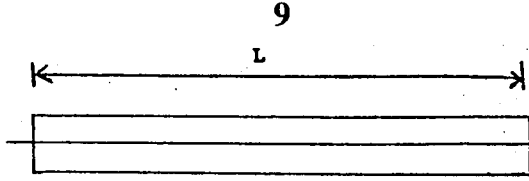

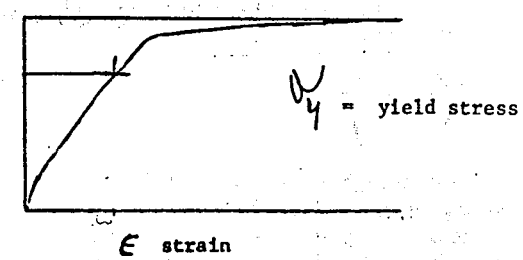

First consider an isotropic rod. (i.e. homogeneous properties).

If a pressure is applied on the left surface according to rigid dynamics, the entire rod experiences the pressure instantly. This obviously is not acceptable for pressure pulses that have wave lengths less than L applied to an elastic body. At this point we define the wave length of a stress pulse as:

C × tp. where C = speed of sound and tp=time duration of stress pulse

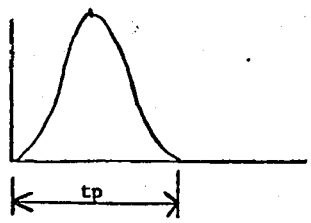

Now consider the rod again with a pulse with a wave length L/3.

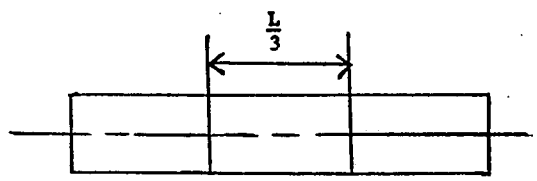

Since the pulse exerts stress(or strain) in only part of the rod, the rod as a whole is stationary.

Let us now consider an inhomogeneous rod with L/3 type pulse. For this purpose a small section in the middle is annealed (soft) and the rest of the rod is hardened.

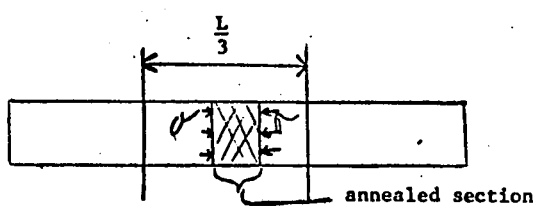

The intensity of the pulse is such that when the pulse passes through the annealed section it renders it plastic, transforming the portion of the elastic wave over the annealed section to a plastic wave.

If the pulse length is adequate, (to overcome internal delay) plastic flow will commence and the annealed section will begin to deform although the entire rod is stationary. The length of the pulse that covers the annealed section then becomes a plastic wave with impedance much lower than the impedance of the hardened section. This occurs because the speed of sound drops drastically when the stress exceeds the yield stress $O_y$.

For example, Bell showed that the general behaviour for aluminum may be as follows:

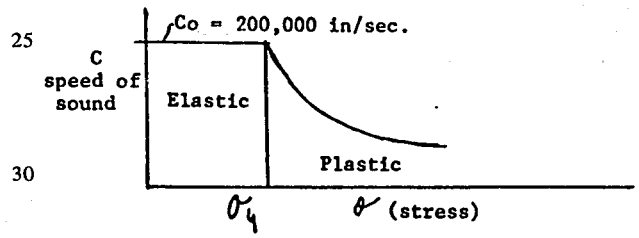

impedence = $C_e \rho$
= (speed of sound)density

C plastic = 3,000 in/sec.

Thus, the annealed section is trapped between two elastic-plastic interfaces under the influence of a plastic wave.

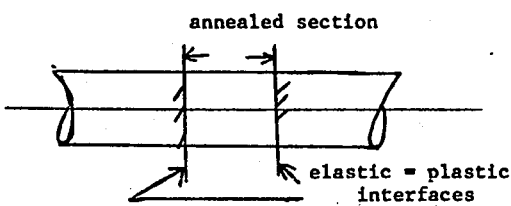

The plastic wave will reflect between these two surfaces. Between reflections the greater portion of the energy in the wave is transformed to energy of plastic deformation.

The two elastic-plastic surfaces will follow if the pulse does not drop quickly. If the stress rise is followed by a quick stress drop, the effect may be limited. For this reason, instead of a rod, a cone or other appropriate area change is used to intensify the pulse so that its energy density $$\left(\frac{\text{ft} - \text{lb}}{\text{in}^3}\right)$$

or stress, is high enough to yield the workpiece as the wave propagates through it.

The area transition can also transform the shape of the pulse so that the plastic flow becomes more effective as the surfaces maintain their relative positions close to the workpiece. The workpiece can be a completely separate part from the two elastic bodies. Furthermore, the workpiece can be made of any size or material other than the material used for the two elastic parts.

The effect of the area change on the stress pulse is different from the simple pressure increase it affords for static and rigid-dynamic conditions. Its length, shape and material constants play important roles for the emerging wave that propagates through the workpiece.

One difference of behaviour, for example, is that the intensification of the pulse is not, in general, equal to the area ratio. That is:

$$\frac{\text{stress output}}{\text{stress input}} \neq \frac{\text{Area input}}{\text{Area output}}$$

It is to be understood that the present invention in its broader aspects is not limited to the specific elements and steps shown and described above, but also includes within the scope of the accompanying claims any departures made from such elements and steps which do not sacrifice their chief advantages.

What is claimed is:

1. A method of spot welding two metallic workpieces of similar materials which are in contact with one another, comprising the steps of:
   electromagnetically generating a stress wave having a high particle velocity;
   conditioning the high velocity stress wave to increase its intensity and duration;
   applying the conditioned stress wave as a single pulse to one of the metallic workpieces; and
   providing sufficient energy density at the interface of the workpieces from the conditioned stress wave pulse to generate enough heat to weld the two metallic workpieces together.

2. A method of spot welding as claimed in claim 1, including the further step of:
   holding the metallic workpieces between a bucking mass and a stress wave conditioner.

3. A method of spot welding as claimed in claim 1, including the further step of:
   heating one of the metallic workpieces prior to application of the conditioned stress wave pulse.

* * * * *